United States Patent Office 2,764,585
Patented Sept. 25, 1956

2,764,585

SPIROBARBITURIC ACID COMPOUNDS

John Lee, Essex Fells, and Franklin Artell Smith, Nutley, N. J., assignors to Hoffmann-La Roche Inc., Nutley, N. J., a corporation of New Jersey No Drawing. Application January 25, 1954,
Serial No. 406,047

4 Claims. (Cl. 260—257)

This invention relates to the compound 6-isopropyl-3,4 - dimethylspiro - [cyclohexane - 1,5' - barbituric acid] which has the structural formula

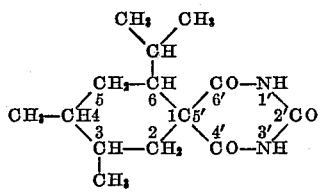

and salts thereof. These compounds are useful as muscle relaxants.

The compounds of this invention may be prepared by reacting 2,3-dimethyl-butadiene with isobutylidene malonic acid diethyl ester to obtain 6-isopropyl-3,4-dimethyl-3-cyclohexene-1,1-dicarboxylic acid diethyl ester. The last named compound is catalytically reduced to obtain 6-isopropyl-3,4-dimethylcyclohexane-1,1-dicarboxylic acid diethyl ester. The above saturated diethyl ester is refluxed with urea in sodium ethoxide and then neutralized with a weak acid to produce 6-isopropyl-3,4-dimethylspiro[cyclohexane-1,5'-barbituric acid].

The compound prepared according to this method may be transformed into alkali metal salts, alkaline earth metal salts, ammonium salts or amine salts by reaction with bases. Alkali metal hydroxides, such as sodium hydroxide, alkaline earth metal hydroxides, such as calcium hydroxide, or ammonium hydroxide produce, respectively, alkali metal, alkaline earth metal, or ammonium salts. Basic amines, such as diethylamine, diethanolamine, ethylenediamine, diethylethylenediamine, methylglucamine, etc., produce the corresponding amine salts of the compound.

*Example 1*

95.2 grams of isobutylidene malonic acid diethyl ester were mixed with 63.5 grams of 2,3-dimethylbutadiene and heated in an autoclave for 12 hours at 170 to 180° C. The reaction mixture was rectified through a Widmer column at 11 mm. pressure and the fraction boiling at 149 to 153° C., containing 6-isopropyl-3,4-dimethyl-3-cyclohexene-1,1-dicarboxylic acid diethyl ester, was collected.

47.5 grams of 6-isopropyl-3,4-dimethyl-3-cyclohexene-1,1-dicarboxylic acid diethyl ester were mixed with 130 cc. of dry methanol and hydrogenated in the presence of 55 grams of 2.5% palladium on charcoal at 1850 p. s. i. and 100° C. When the calculated amount of hydrogen was absorbed, the reaction mixture was cooled and the catalyst was filtered off. The solvent was stripped in vacuo and the product fractionated through a Widmer column at 10 to 11 mm. pressure. 6-isopropyl-3,4-dimethylcyclohexane-1,1-dicarboxylic acid diethyl ester was thus obtained.

35 grams of the material obtained in the preceding paragraph were treated in alcoholic sodium ethoxide solution with 10.6 grams of urea. After refluxing for 10 hours, the reaction mixture was stripped of alcohol in vacuo and the residue was taken up in water and extracted with ether. The aqueous solution was neutralized with carbon dioxide. The product thus obtained was filtered off and washed with water. The 6-isopropyl-3,4-dimethylspiro[cyclohexane-1,5'-barbituric acid] so obtained was recrystallized twice from aqueous ethanol, M. P. 167 to 168.5° C. (uncorr.).

*Example 2*

27 grams of the spirobarbituric acid compound obtained in Example 1 were converted to the sodium salt by dissolving in 300 cc. of ethanol, adding 101.5 cc. of 1 N sodium hydroxide solution, clarifying, then removing the solvent in vacuo under nitrogen. The residue was desiccated in high vacuo over phosphorus pentoxide.

We claim:

1. A compound of the group consisting of 6-isopropyl-3,4-dimethylspiro[cyclohexane-1,5'-barbituric acid] and atoxic anionic salts thereof.

2. 6-isopropyl-3,4-dimethylspiro[cyclohexane-1,5'-barbituric acid].

3. Alkali metal salts of 6-isopropyl-3,4-dimethylspiro[cyclohexane-1,5'-barbituric acid].

4. The sodium salt of 6-isopropyl-3,4-dimethyl spiro[cyclohexane-1,5'-barbituric acid].

References Cited in the file of this patent

Cope et al., JACS 71, 3658–62 (1949).